(12) United States Patent
Bhavnani et al.

(10) Patent No.: US 7,472,146 B2
(45) Date of Patent: Dec. 30, 2008

(54) NON-LINEAR ALGORITHM CALCULATING DEVICE

(75) Inventors: Dilip Bhavnani, Beverly Hills, CA (US); Todd Zimmerman, Moorestown, NJ (US)

(73) Assignee: Sun Most, LLC, Commerce, CA (US)

( * ) Notice: Subject to any disclaimer, the term of this patent is extended or adjusted under 35 U.S.C. 154(b) by 63 days.

(21) Appl. No.: 11/380,000

(22) Filed: Apr. 26, 2006

(65) Prior Publication Data

US 2007/0022150 A1 Jan. 25, 2007

Related U.S. Application Data

(63) Continuation-in-part of application No. 11/148,681, filed on Jun. 8, 2005, now Pat. No. 7,236,994, which is a continuation-in-part of application No. 11/051,203, filed on Feb. 3, 2005, now Pat. No. 7,033,102, which is a continuation-in-part of application No. 10/916,652, filed on Aug. 11, 2004, now Pat. No. 6,890,117.

(60) Provisional application No. 60/510,561, filed on Oct. 10, 2003.

(51) Int. Cl.
*G06F 3/00* (2006.01)
(52) U.S. Cl. .................................... 708/132
(58) Field of Classification Search .................. 708/132
See application file for complete search history.

(56) References Cited

U.S. PATENT DOCUMENTS 4,007,364 A * 2/1977 Ojima et al. ................ 708/107
4,141,073 A 2/1979 Tan
4,984,494 A 1/1991 Yang
5,028,764 A 7/1991 Kuhlengel
5,754,645 A 5/1998 Metroka et al.
5,796,640 A * 8/1998 Sugarman et al. ........... 708/132
6,011,486 A * 1/2000 Casey ........................ 340/7.29
6,104,603 A 8/2000 Wang
6,266,685 B1 * 7/2001 Danielson et al. ........... 708/141
6,507,486 B2 * 1/2003 Peterson, III ............... 361/683
6,742,953 B2 * 6/2004 Burden et al. ............... 401/194
D500,518 S 1/2005 Fraser et al.
2003/0002685 A1 * 1/2003 Werblud ...................... 381/67
2007/0053739 A1 3/2007 Kroggel
2007/0058818 A1 * 3/2007 Yoshimine ................... 381/67

\* cited by examiner

*Primary Examiner*—David H Malzahn
(74) *Attorney, Agent, or Firm*—The Soni Law Firm

(57) ABSTRACT

A portable hand-held device for producing output values, such as body mass index calculations, has a hand-holdable housing that includes a memory unit storing a pre-defined non-linear algorithm. A processing unit located in the housing applies the algorithm to input values selected by an input means on the housing, and produces output values via an output means on the housing. The range of selectable input values is pre-defined and is assignable to variables for applying the algorithm. Advertising indicia may be imprinted on the housing, and the housing may be attached to external devices. Optionally, a timing unit, such as a countdown timer, may be included.

35 Claims, 4 Drawing Sheets

HEIGHT ENTRY SCREEN

WEIGHT ENTRY SCREEN

BMI RESULT

LBS OVER SCREEN

NORMAL WEIGHT

TIMER SCREEN

MP3 SCREEN

NON-LINEAR ALGORITHM CALCULATING DEVICE

CROSS-REFERENCE TO RELATED APPLICATIONS

This application claims priority to and is a continuation-in-part application of utility patent application Ser. No.11/148,681 filed Jun. 8, 2005 and issued as U.S. Pat. No. 7,236,994 on Jun. 26, 2007, which is a continuation-in-part application of application Ser. No. 11/051,203 filed on Feb. 3, 2005 and issued as U.S. Pat. No. 7,033,102 on Apr. 25, 2006, which is a continuation-in-part application of utility patent application Ser. No. 10/916,652 filed on Aug. 11, 2004 and issued as U.S. Pat. No. 6,890,117 on May 10, 2005, which was originally filed as provisional application Ser. No. 60/510,561 on Oct. 10, 2003.

DESCRIPTION

The present invention relates to the field of calculating devices and more specifically to portable hand-held electronic devices having an algorithm stored therein.

STATEMENT RE: FEDERALLY SPONSORED RESEARCH/DEVELOPMENT (Not Applicable)

BACKGROUND OF THE INVENTION

The present invention generally relates to an electronic device that includes a means for calculating a non-linear equation of any type. For example, one use of the invention would be to calculate a person's body mass index (BMI), which may be determined based on the following equation: $M/L^2$, where M is the body weight in kilograms, and L is the body height in meters. It is recognized that other equations may be used for calculating body mass index. For instance, the body weight may be expressed in pounds, and the body height by inches. Nonetheless, the present invention may be used as a calculating device to calculate the resultant number from a predetermined non-linear equation.

Numerous pens and other devices are available to determine the resultant figure from a simple linear equation, such as an ordinary mathematical multiplication table. In order to calculate a non-linear function, however, a logarithmic type of scale must be introduced, as well as a means for accessing the appropriate numerical values on both the logarithmic scale and the remaining factor(s) of the equation.

The ability to utilize an electronic device to perform quick and accurate calculations would benefit the user by reducing their dependence upon number of separate products including, for example, various medical instruments, tables, books and charts, pieces of diagnostic equipment, stethoscopes, height/weight scales, writing pens, patient charts, prescription pads, and the like. Although conventional electronic devices may be effective in calculating non-linear equations, the user must handle and operate these devices separately in addition to various other items. Many health-care providers, technicians, mechanics and other users would like to reduce the number of items that they must handle during the performance of their duties.

The present invention generally relates to a hand-held device which is capable of computing a single type of computation using a single set of input variables (which are related by their mathematical formulas and/or their interrelated technological relationships or values). For example, a physician may use such an implement to calculate the various physiological relationships for a patient, such as their Body Mass Index, Body Surface Area, Creatinine Clearance and Hemoglobin A1C to Mean Plasma Glucose Estimation and other associated measures. In the past, upon examining a patient and obtaining his or her vitals, the medical service provider would then refer to separate specific formulas and tables to compute the desired information for the patient.

While hand-held calculators may perform some of these functions, the relatively large size and lack of attachment means make them not as desirable as a portable hand-held non-linear algorithm calculating device. Moreover, previously designed calculators typically perform singular functions and do not incorporate preprogrammed mathematical formulas for the calculation of specific measures or values required in particular fields of use. Moreover, commonly known calculators cannot be secondarily used as a countdown timer or attach to a stethoscope.

The need for a calculating product incorporated in a hand held implement has been attempted in the past. U.S. Pat. No. 5,028,764 to Kuhlengel discloses a pen with rotatable cylindrical elements that is used to perform a simple calculation in the multiplication of two numbers. In this patent, the invention provides its user no capability to perform a specific calculation based upon a preprogrammed known scientific formula, as the pen will not permit a calculation other than basic multiplication and relies upon the user to supply a formula. U.S. Pat. No. 4,141,073 to Tan describes a pen that may be used to perform various calculations. In that pen, signals generated by the pen tip through designated strokes of numerals and calculating symbols upon writing on any surface of any writing medium are input directly to the calculator to perform calculating and displaying functions. The Tan invention therefore is doubly complicated as it relies upon the user to know or refer to a specific formula and thereafter demands the user essentially tap out a series of carefully orchestrated movements in order to perform even the simplest calculation. Therefore, neither patent involves a device which may be employed to quickly determine the numerical outcome of a specific formula or equation, such as the Body Mass Index.

U.S. Pat. No. 6,104,603 to Wang discloses a writing pen with an integral electronic calculator including printed circuit board, keyboard and power supply. While this invention is perhaps more versatile than those of Kuhlengel and Tan, it too is nothing more than the insertion of a hand held calculator into a pen. The user must still refer to outside formulas and take care to properly input any specific variables if they wish to perform a calculation based on a specific known formula. Moreover, that device has little or no capability to handle non-linear and other unusual relationships between variables in a known scientific formula, such as those physiological factors for which different values must be used for each sex.

Therefore, there is a need for a portable hand-held electronic device that is capable of calculating a non-linear algorithm, includes a countdown timer, and an attachment means for retaining the device against an external object, such as a stethoscope.

BRIEF SUMMARY OF THE INVENTION

The present invention addresses and overcomes the need for the an individual to have at hand the above described hand held calculators, books and manuals by providing a portable hand-held device that combines a countdown timer with a non-linear algorithm to determine a single type of result so as to provide a fixed pre-defined range of output values from a fixed pre-defined range of input values assignable to at least two variables, such as height and weight where body mass index is the desired result. The device is also contemplated as being simultaneously used as a countdown timer for measuring bloodpressure.

Advantageously, professionals such as mortgage brokers or car salesmen, engineers, mechanics or bartenders commonly encounter repetitive needs to conduct calculations based on mathematical formulas. In the case of an engineer, he or she may require a calculation for stress, bending, forces, torque and many other measures. Mortgage brokers and salesmen may need to calculate interest rates, down payments required, monthly payments and other calculations derived from the same basic known formulas.

In accordance with a preferred embodiment of the present invention, there is provided a portable multi-function handheld device for storing a matrix of data and producing a single type of index value or result. The device formed according to the present invention is preferably formed having a handholdable housing that includes a pair of opposing side faces, a top face extending between the side faces, a front face extending generally perpendicular with respect to the side faces, and a back face opposing the front face and being coplanar therewith. Preferably, an input means is provided on one of the faces, and even more preferably on one of the side faces for easy access by a user's thumb. Even more preferably, the input means includes a data encoder connected to a switch element. An output means is provided that is preferably disposed on the top face of the housing adjacent a visual indicator and a plurality of buttons. Advantageously, the device is configured to be operated completely with one hand and may simultaneously compute a non-linear algorithm while providing countdown timing functions. Preferably, a memory unit is disposed within the housing and includes a single pre-defined non-linear algorithm. The algorithm includes a pre-defined range of output values and at least two pre-defined variables. Each of the variables have a range of pre-defined numerical input values assignable thereto. The range of input values assignable to the variables may be of different range values. The input values are selected and assigned to the variables via the input means which is electrically connected to the memory unit.

A processing unit is disposed in the housing and electrically connected to the memory unit and the input means. The processing unit is configured to calculate the output values by receiving the input values selected via the input means which are assigned to the variables, and applying the algorithm to the variables to determine the output values.

An output means is provided for visually and audibly indicating the output values to the user. The output means is electrically connected to the processing unit.

An attachment means is provided for selectively removably attaching the housing to an external article so as to provide unattended or one-handed operation of the unit while it is simultaneously computing the algorithm and employing the countdown timer.

Advertising indicia may be disposed upon a portion of the housing to provide marketing of a product while an external observer, such as a patient, is having his or her bloodpressure taken.

It is also contemplated that multiple non-linear algorithms may be stored in the processing unit so as to provide multiple types of output values using the same variables assigned from the input values.

DETAILED DESCRIPTION OF THE INVENTION

Figure 1:
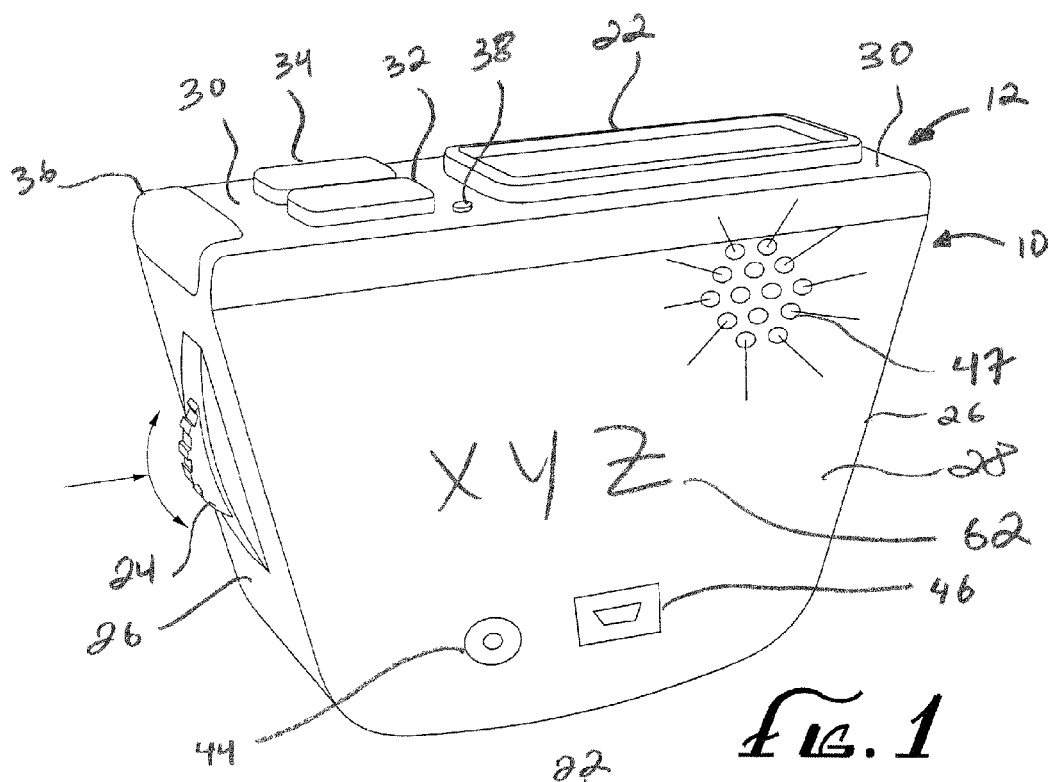
FIG. 1 illustrates a perspective front-side view of the device formed according to the present invention.
Figure 2:
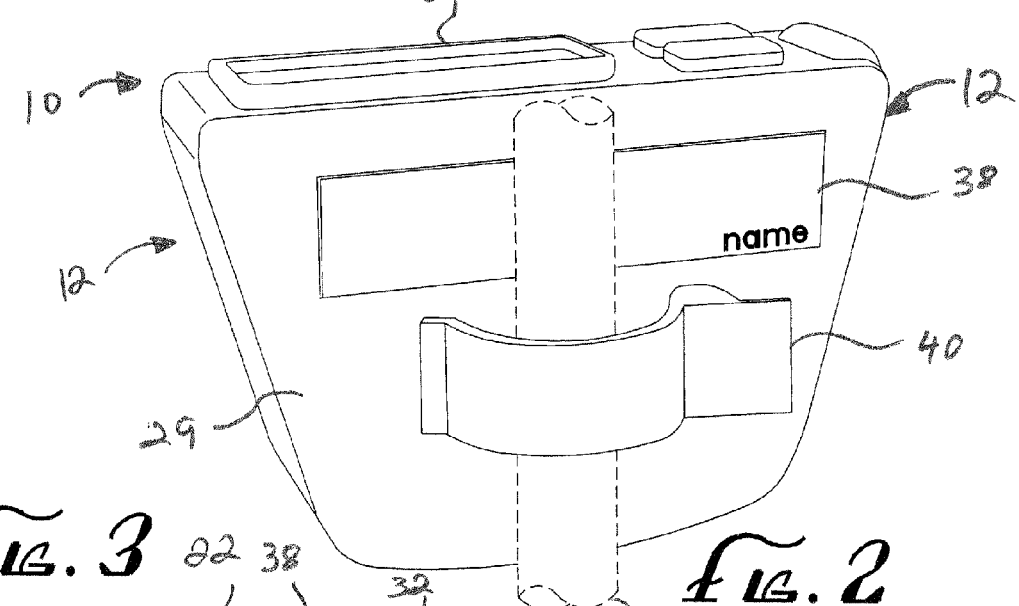
FIG. 2 illustrates a perspective back-side view of the device formed according to the present invention.
Figure 3:
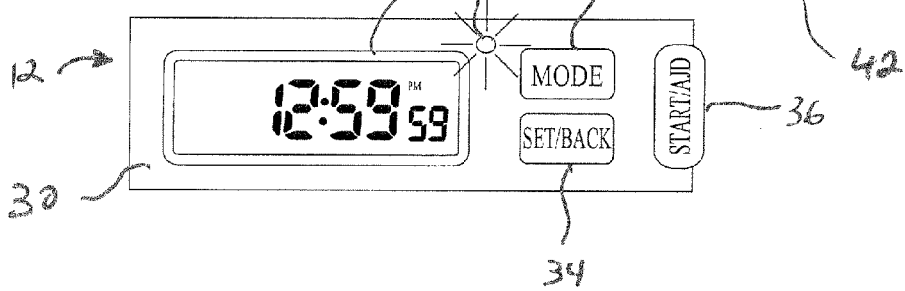
FIG. 3 illustrates a top plan view of the device formed according to the present invention showing a display with time.

Referring now to the drawings wherein the showings are for purposes of illustrating preferred embodiments of the present invention only, and not for purposes of limiting the same, in FIGS. 1-3 illustrate a preferred embodiment of the non-linear algorithm calculating device 10 is shown. Preferably, the device 10 is formed having a substantially handholdable portable housing 12 having a pair of opposing side faces 26, a top face extending generally between the side faces 26, and a generally planar front face extending between the side faces 26. The top face 30 is preferably formed having a generally planar configuration. The top face 30 also includes a buttons 32, 34, and 36 which may correspond to different functions depending upon the embodiment. For example, when the device 10 is configured having a body mass index algorithm, button 32 preferably selects the various modes of operation available in the device 10, button 34 allows for selection of data and may alternatively allow a user to go back up one menu level, while button 36 may be configured for adjustments and commencing a timer, when so equipped. For example, in operation, button 32 may be pressed to select a countdown timer, alarm clock, stopwatch, time adjustment mode, or body mass index calculation mode. Button 34 may then be used to select the desirable mode and pressed again to begin a function, such as the countdown timer, and restart the same. Button 36 may then be used to make adjustments to settings within each mode, such as turning on the alarm feature. Alternatively, buttons 32, 34, and 36 may cooperate to form the input means such that value selections are made and assigned to variables.

Referring now to FIGS. 1 and 3, equipped with a timing unit, a visual indicator 38 may be formed on the housing 12 for indicating confirmation of selections, alerting the user when the countdown timer completes, and other functions where it is desirable to see a confirmation, but it is difficult to hear. Such an ideal situation is when a physician uses the device 10 to measure blood pressure while wearing a stethoscope. The physician may be occupied listening for a heartbeat and may not be able to hear an audible confirmation.

Referring now to FIG. 1, a speaker 47 may be provided for providing audible confirmation signals and other data. Preferably, the speaker 47 is formed on the front face 28 of the housing 12. Optionally, the speaker 47 may be part of the output means for providing audible data relating to the output values, such as a voice representation of the output values.

Referring now to FIG. 2, the device 10 may be formed having a messagepiece 38 for indicating ownership of the device 10. Preferably, the messagepiece 38 is formed such that a recess is formed on the back face 29 of the housing 12. A paper or cardboard material substantially conforming to the size and shape of the recess may be inserted into the recess with a transparent plastic cover superimposed over the material.

Referring now to FIG. 2, an attachment means 40 may be provided such that the housing 12 is selectively attachable to an external article. Preferably, the attachment means is formed as a clip 40 sized and configured to removably secure the housing 12 against the external article. Even more preferably, the clip may be formed having a profile substantially conforming to the size and shape of a stethoscope tube. The clip may also include a spring attached thereto for providing tensional force to the clip. Advantageously, by providing a clip conforming to a stethoscope tube, a physician may attach the device 10 to his or her stethoscope and place the device 10 into a countdown timer mode. This way, the physician can take a patient's bloodpressure without holding the device, and have the ability to track the countdown timer's progress while working with an armcuff pump in one hand, and feeling the patient's heartbeat with the other hand. The attachment means may also take the form of hook and loop fasteners, other types of clips and attachment devices that may be used to attach the housing 12 to a stethoscope or article of clothing.

Figure 4:
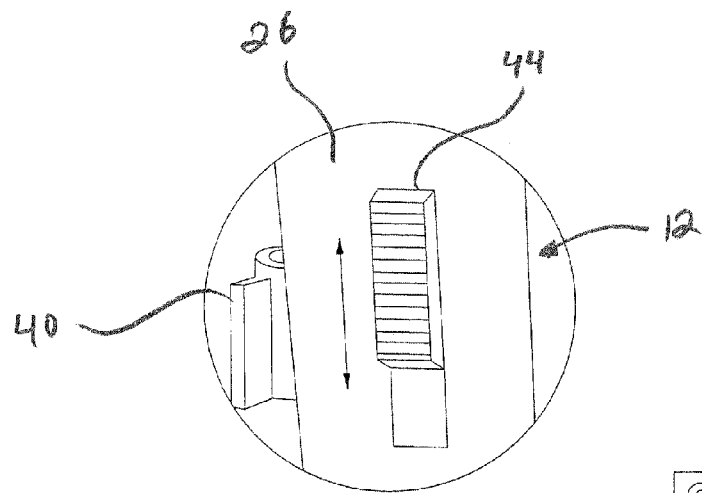
FIG. 4 illustrates a side perspective view of an alternative embodiment of the device formed according to the present invention showing the input member as a slidable switch disposed on the housing.

Referring now to FIGS. 1 and 4, the input means is preferably formed as a data encoder 24 disposed on the side face 26 of the housing 12. Even more preferably, the data encoder 24 is a potentiometer. The data encoder 24 is preferably formed as a rotatable dial and may be connected to a switch element such that depressing the data encoder 24 places the same into contact with the switch element. In such a combination, the data encoder 24 may be used to scroll through the input values for a variable and then depressed to assign an input value to the variable. Alternatively, as shown in FIG. 4, the input means may be formed as a slideable switch 44 that may also be connected to a switch element in the same manner.

Figure 12:
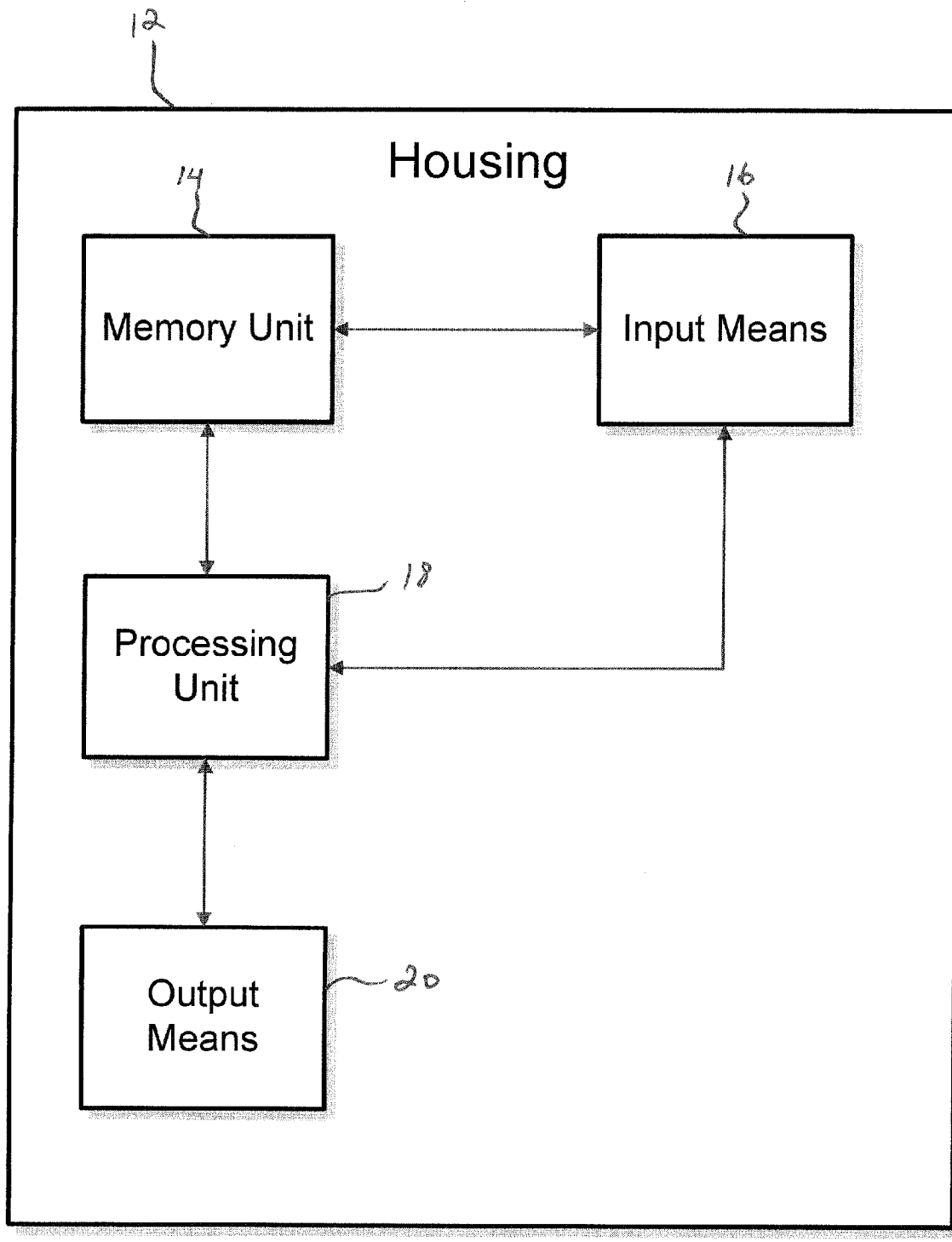
FIG. 12 illustrates a block diagram of the housing having a memory unit, inputs means, processing unit, and an output means therein.
Figure 13:
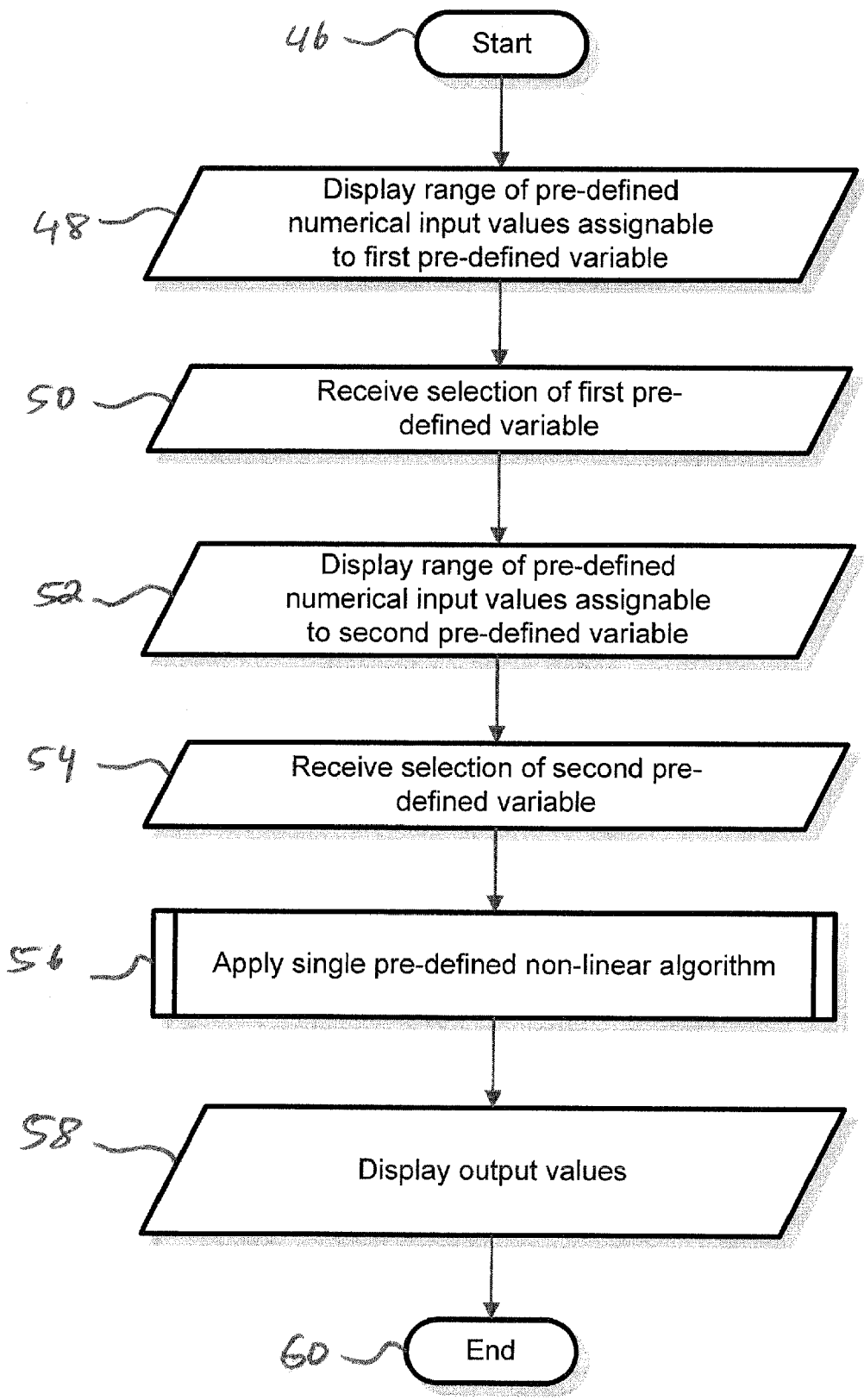
FIG. 13 illustrates a logic diagram of the device formed according to the present invention.

Referring now to FIG. 12, the housing is preferably formed having a memory unit having a single pre-defined non-linear algorithm. The algorithm preferably includes a pre-defined range of output values and at least two pre-defined variables, each of which have a range of pre-defined numerical input values assignable thereto. The memory unit is electrically connected to an input means 16 that is configured to allow selection of input values for each of the respective at least two variables. A processing unit 18 is disposed within the housing and electrically connected to the memory unit 14 and the input means 16. The processing unit 18 is configured to produce the output values by receiving the input values selected via the input means 16 and applying the algorithm to the at least two pre-defined variables. An output means 20 is electrically connected to the processing unit 18 for outputting the output values produced by the algorithm.

Preferably, the memory unit 14 includes a ROM (Read-Only Memory) chip storing the algorithm therein and a RAM (Random Access Memory) chip for temporary storage of input values and other data inputted by the user. Even more preferably, the output means 20 may be a Referring now to FIGS. 5-9 and 13, the preferable logic process of producing output values is illustrated. The logic begins 46 when a user selects the algorithm mode via the input means or one of the buttons 32, 34, or 36. Preferably, the logic process 46 may be selected simultaneously with other functions, such as while a countdown timer is running. Even more preferably, the algorithm is one which computes body mass index, excess weight, and normal weight.

Figure 5:
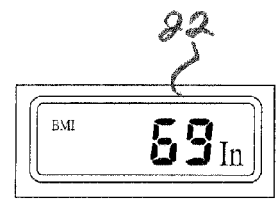
FIG. 5 illustrates a display showing a pre-defined numerical input value that for assignment to the variable, height.

The logic continues 48 and prompts the user to input the first of at least two variables. The first variable is selected by displaying the range of pre-defined numerical input values assignable to the first pre-defined variable. For example, where height is the first variable, height represented in inches may be selectable in the range of 58 to 76 inches. The user may view the range of input values for the first pre-defined variable by cycling through the values via the input means 24. The logic continues 50 by receiving the user's selection of the first pre-defined variable, such as 69 inches, which converts to 5 feet 9 inches, as shown in FIG. 5.

The logic continues 52 by displaying a range of pre-defined numerical input values assignable to the second pre-defined variable. The range of pre-defined numerical input values assignable to the second pre-defined variable are preferably a set of different numerical values than the range available for selecting the first pre-defined variable. For example, where weight is the second variable, weight represented in pounds may be selectable in the range of 85 to 450 pounds.

Figure 6:
FIG. 6 illustrates a display showing a pre-defined numerical input value for assignment to a variable, weight.

The logic continues 54 and the user again selects the second variable via the input means 24 such that the device receives the second variable, such as 190 pounds, as shown in FIG. 6.

Figure 7:
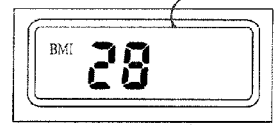
FIG. 7 illustrates a display showing a pre-defined output value computed by an algorithm, the body mass index calculation.
Figure 8:
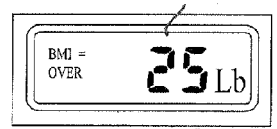
FIG. 8 illustrates a display showing a pre-defined output value computed by an algorithm, excessive weight value.
Figure 9:
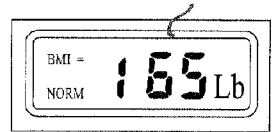
FIG. 9 illustrates a display showing a pre-defined output value computed by an algorithm, the normal weight value.
Figure 10:
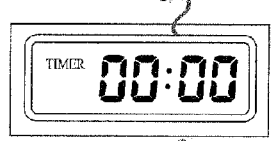
FIG. 10 illustrates a display showing a countdown timer.

The logic continues 56 by applying the algorithm to the two variables. Preferably, the processing unit applies this algorithm by comparing the values of the two variables received from the user to a matrix of pre-defined output values stored within the memory unit 14 and produces the output values corresponding to the same. In other words, due to the fixed nature of the output values that can be produced by the device, there are limited combinations of output values that may be produced and computation may not be necessary. For example, in the preceding example, a height value of 69 inches for the first variable and a weight value of 190 pounds for the second variable would produce an output value corresponding to a body mass index of 28 as shown in FIG. 7, normal weight value of 165 pounds as shown in FIG. 9, and excess weight value of 25 as shown in FIG. 8. These output values may be pre-defined and stored in the memory unit 14.

Alternatively, the algorithm may include a series of equations stored in the processing unit 18. For example, body mass index may be calculated by the following equation: $M/L^2$, wherein M is body weight in kilograms and L is height in meters. This equation may be stored in the processing unit 18 such that the calculation is done on command upon input of the variables, height and weight. Or alternatively, a combination of providing on-demand calculations and recalling pre-defined output values may be employed such that the body mass index is computed according to a formula and remaining output values such as normal weight may be produced and displayed on the output means for a corresponding body mass index calculation. Even further, excess weight may be computed by subtracting the normal weight values from the inputted weight variable received from the user via the input means 16.

Referring now to FIG. 1, advertising indicia 62 may be imprinted on the front face 27 of the housing 12 so as to provide a visible advertisement of products when worn by a user in the preferable manner. For example, when a physician uses the device to take a patient's bloodpressure, the attachment means is preferably disposed on the back face 29 so that the back face 29 is facing the physician while the opposing front face 28 is facing the patient. In this manner, the advertising indicia 62 is visible to the patient when having his or bloodpressure taken. This is an especially effective form of advertising because while the patient's bloodpressure is being measured, the patient must remain relatively still. Such patients typically focus their attention upon one object so as to assist in remaining still and the advertising indicia 62 becomes an ideal and highly visible object to focus upon during this time. Advantageously, the advertising indicia 62 may be laser engraved on the front face 28 or may take the form of a full color logo.

Figure 11:
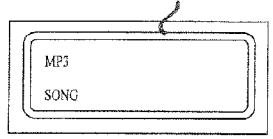
FIG. 11 illustrates a display showing digital audio playback information.

In an alternative embodiment of the present invention, the device 10 may be equipped with a digital audio playback device, such as an MP3 player, or other multimedia device. When so equipped, a bi-directional input/output port 46 may be disposed on the housing 12 to provide for uploading and downloading of music and other data. Optionally, the device 10, even when not equipped with digital audio playback circuitry, may utilize the port 46 to save data from the device 12 to a computer. Even more preferably, the port 46 is a USB (Universal Serial Bus) port. When equipped with digital audio playback circuitry, a headphone port 44 may be provided. As shown in FIG. 11, the digital audio playback functions may be selected via the input means 24 or the buttons 32, 34, or 36, and displayed on the output means 22 to indicate name of songs, volume, and other music data.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A portable hand-held device comprising:
   a hand-holdable housing;
   a memory unit disposed within the housing, the memory unit having a single pre-defined non-linear algorithm, the algorithm including a pre-defined range of output values and at least two pre-defined variables, each of which have a range of pre-defined numerical input values assignable thereto;
   an input means disposed on the housing and electrically connected to the memory unit, the input means being configured for assigning the input values to each of the respective at least two variables;
   a processing unit disposed within the housing, the processing unit being electrically connected to the memory unit and the input means, the processing unit being configured to produce the output values by receiving the input values assigned to the at least two variables, and applying the algorithm to the received input values;
   a countdown timer disposed within the housing for counting a predetermined time interval while the processing unit is active and for producing countdown signals, the countdown timer being selectable via the input means; and
   an output means disposed on the housing and electrically connected to the processing unit and the countdown timer for outputting the output values and the countdown signals,
   wherein the processing unit and countdown timer are each configured to simultaneously produce output values and countdown signals respectively during the operation of the other without interruption thereof.

2. The device as in claim 1 wherein the output means includes an electronic display disposed on the housing and the countdown signals include digital numerals on the electronic display.

3. The device as in claim 2 wherein the input means includes a data encoder disposed on the housing for selectively displaying the range of pre-defined numerical input values.

4. The device as in claim 3 wherein the data encoder is connected to a switch element, the switch element being electrically connected to the processing unit for assigning the numerical input values to the at least two pre-defined variables.

5. The device as in claim 1 wherein the output means includes a speaker and the countdown signals include an audible alert to be output through the speaker.

6. The device as in claim 1 wherein the input means is further configured to be capable of assigning the input values to each of the respective at least two variables during the operation of the countdown timer without interruption thereof.

7. The device as in claim 4 wherein the data encoder is a rotatable dial.

8. The device as in claim 1 wherein the single pre-defined non-linear algorithm is a body mass index calculation.

9. The device as in claim 8 wherein the at least two pre-defined variables are selected from the group consisting of height and weight.

10. The device as in claim 9 wherein the pre-defined range of output values includes body mass index values, excessive weight values, and normal weight values.

11. The device as in claim 10 wherein the output means includes an electronic display disposed on the housing and the countdown signals include digital numerals on the electronic display.

12. The device as in claim 11 wherein the input means includes a data encoder disposed on the housing for displaying the range of pre-defined numerical input values.

13. The device as in claim 12 wherein the data encoder is connected to a switch element for assigning one of the numerical input values to the at least two pre-defined variables.

14. The device as in claim 13 wherein the data encoder is a rotatable dial.

15. The device as in claim 13 wherein the output means further includes a speaker and the countdown signals include an audible alert to be output through the speaker.

16. The device as in claim 15 wherein the input means is further configured to be capable of assigning the input values to each of the respective at least two variables during the operation of the countdown timer without interruption thereof.

17. The device as in claim 1 wherein the processing unit further includes digital audio player circuitry, and the housing further includes a bi-directional input/output port electrically connected to the processing unit.

18. A portable hand-held device comprising:
a hand-holdable housing;
a memory unit disposed within the housing, the memory unit having a single pre-defined non-linear algorithm, the algorithm including a pre-defined range of output values and at least two pre-defined variables, each of which have a range of pre-defined numerical input values assignable thereto;
an input means disposed on the housing and electrically connected to the memory unit, the input means being configured for assigning the input values to each of the respective at least two variables;
a processing unit disposed within the housing, the processing unit being electrically connected to the memory unit and the input means, the processing unit being configured to produce the output values by receiving the input values assigned to the at least two variables, and applying the algorithm to the received input values;
a countdown timer disposed within the housing for counting a predetermined time interval while the processing unit is active and for producing countdown signals, the countdown timer being selectable via the input means;
an output means disposed on the housing and electrically connected to the processing unit for outputting the output values; and
an attachment means disposed on the housing for selectively removably attaching the device to an external article.

19. The device as in claim 18 wherein the attachment means includes a clip sized and configured to removably secure the housing against the external article.

20. The device as in claim 19 wherein the clip is formed having a profile substantially conforming to the size and shape of a stethoscope tube.

21. The device as in claim 19 wherein the clip includes a spring attached thereto for providing tensional force to the clip.

22. The device as in claim 18 wherein the output means includes an electronic display disposed on the housing.

23. The device as in claim 22 wherein the input means includes a data encoder disposed on the housing for selectively displaying the range of pre-defined numerical input values.

24. The device as in claim 23 wherein the data encoder is connected to a switch element, the switch element being electrically connected to processing unit for assigning the numerical input values to the at least two pre-defined variables.

25. The device as in claim 18 wherein the single pre-defined non-linear algorithm is a body mass index calculation.

26. The device as in claim 25 wherein the at least two pre-defined variables are selected from the group consisting of height and weight.

27. The device as in claim 26 wherein the pre-defined range of output values includes body mass index values, excessive weight values, and normal weight values.

28. The device as in claim 27 wherein the output means is an electronic display disposed on the housing.

29. The device as in claim 28 wherein the input means is a data encoder disposed on the housing for displaying the range of pre-defined numerical input values.

30. The device as in claim 29 wherein the data encoder is connected to a switch element for assigning one of the numerical input values to the at least two pre-defined variables.

31. The device as in claim 30 wherein the data encoder is a rotatable dial.

32. The device as in claim 18 wherein the processing unit further includes digital audio player circuitry, and the housing further includes a bi-directional input/output port electrically connected to the processing unit.

33. A method of advertising comprising the steps of:
(a) fabricating a portable hand-held device comprising:
a hand-holdable housing,
a memory unit disposed within the housing, the memory unit having a single pre-defined non-linear algorithm, the algorithm including a pre-defined range of output values and at least two pre-defined variables, each of which have a range of pre-defined numerical input values assignable thereto,
an input means disposed on the housing and electrically connected to the memory unit, the input means being configured for assigning the input values to each of the respective at least two variables,
a processing unit disposed within the housing, the processing unit being electrically connected to the memory unit and the input means, the processing unit being configured to produce the output values by receiving the input values assigned to the at least two variables, and applying the algorithm to the received input values,
a countdown timer disposed within the housing for counting a predetermined time interval while the processing unit is active and for producing countdown signals, the countdown timer being selectable via the input means, and
an output means disposed on the housing and electrically connected to the processing unit and the countdown timer for outputting the output values and the countdown signals,
wherein the processing unit and countdown timer are each configured to simultaneously produce output values and countdown signals respectively during the operation of the other without interruption thereof; and
(b) printing advertising indicia upon a portion of the housing.

34. The method as in claim 33 wherein the advertising indicia is a color logo.

35. The method as in claim 33 wherein the advertising indicia is laser engraved on the housing.

* * * * *